United States Patent [19] [11] 3,792,991
Couquelet [45] Feb. 19, 1974

[54] MACHINE FOR THE PRODUCTION OF HOLLOW GLASS BODIES

[75] Inventor: Dieudonne Couquelet, Esneux, Belgium

[73] Assignee: Ateliers de Construction mecanique Dieudonne Couquelet, societe anonyme, Grivegnee, Belgium

[22] Filed: Dec. 6, 1971

[21] Appl. No.: 205,042

[30] Foreign Application Priority Data
Dec. 7, 1970  Belgium .............................. 759980

[52] U.S. Cl. ...................... 65/272, 65/280, 65/296, 214/1 BC, 214/3.1, 294/108
[51] Int. Cl. .......................................... C03b 23/04
[58] Field of Search ....... 65/97, 105, 112, 113, 269, 65/270, 271, 278, 272, 280, 292–299; 214/3.1, 1 BC; 294/106, 108

[56] References Cited
UNITED STATES PATENTS
3,157,328   11/1964   Hennings et al. ................. 65/113 X
3,189,423   6/1965    Paione ................................. 65/105
3,627,505   12/1971   Engle .................................. 65/269
890,316     6/1908    Wadsworth ......................... 214/3.1
2,665,831   1/1954    Midgley et al. .................... 214/3.1
1,170,257   2/1916    Hitchcock ........................... 214/3.1

Primary Examiner—Robert L. Lindsay, Jr.
Attorney, Agent, or Firm—Young & Thompson

[57] ABSTRACT

A machine for the production of hollow glass bodies from glass tubes comprises a fixed pedestal, a drum rotatable on the pedestal about a vertical axis, and rotating upper and lower grippers on the drum. Fixed blowpipes about the drum heat the tubes whereupon the tubes sever by thermal shock. Each gripper comprises a plurality of coacting gripping fingers whose ends are specially shaped to support the severed hollow body.

1 Claim, 5 Drawing Figures

PATENTED FEB 19 1974 3,792,991
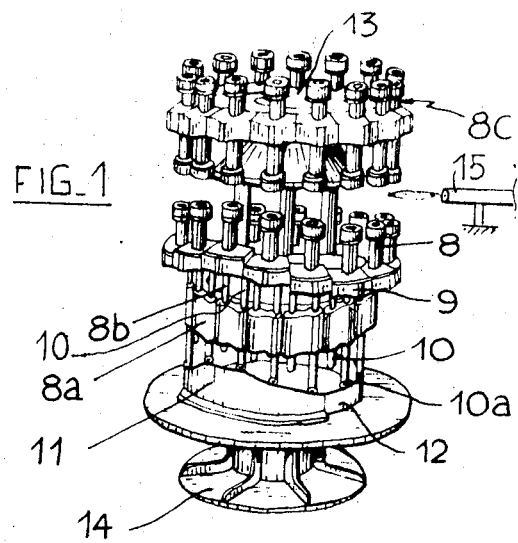
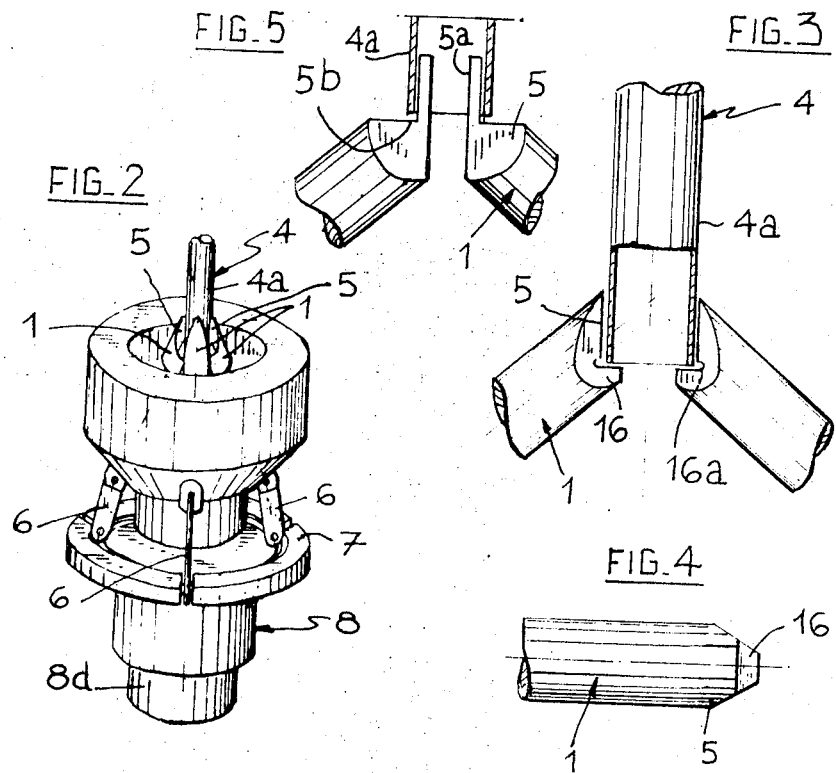

MACHINE FOR THE PRODUCTION OF HOLLOW GLASS BODIES

This invention relates to an apparatus for producing hollow products, especially of glass, from tubes.

Rotary machines are known for producing such hollow glass products, e.g., medicinal phials, wherein a fixed pedestal is provided with a vertical shaft carrying a rotary drum. On the drum periphery are provided gripping heads arranged in pairs the heads in each pair being vertically aligned with each other. Glass tubes are held by gripping fingers pivotally connected to the gripping heads and pass in succession, as the drum rotates, by working stations arranged around the outside of the drum and wherein different operations required for the manufacture of hollow glass products are carried out by means of burners or other tools.

During the production process, the lower end of each tube, fabricated into the shape of the hollow product, must be separated at a given instant from the upper part of the tube which is held by the gripping fingers of the corresponding upper gripping head.

Thermal shock is normally employed to perform this separation: a small notch is cut at the predetermined position in the tube, thus forming a fracture "primer." This position in the tube is heated and subsequently chilled suddenly, thereby producing internal strains in the glass which cause a fracture in the glass. The product formed is separated from the upper end of the tube.

It is already known to provide each gripping finger pivotally connected to the lower gripping heads with a resilient thrust member consisting of a spring, arranged to bias temporarily against the product formed from the glass tube, which product is thereby held during the severing operation.

The arrangement was designed to achieve clean separation without producing glass splinters, to prevent the product detached from falling freely, and to hold the product in a desired orientation after the severing action.

However this known arrangement has shortcomings: since the product is held temporarily by flexible members during the severing operation, the fracture is frequently imperfect leading to a large proportion of scrap and rejects; moreover, the products detached are not always positioned at the same height with respect to the pedestal, which causes difficulties in subsequent operations.

An object of the present invention is to provide an apparatus for producing hollow products from tubes in a continuous and systematic manner, and wherein the products are broken off from a portion of the tubes in a clean and uniform manner, and wherein the products are firmly held as soon as they have been formed by severing, so that subsequent manufacturing operations can be carried out thereon.

Accordingly the present invention provides a machine for the production of hollow glass elements from glass tubes passing into upper and lower grasping heads borne by a drum turning on a vertical shaft installed on a fixed pedestal and equipped with pivotally arranged gripping fingers, characterised in that each lower grasping head comprises a means of supporting the hollow element severed, on which the said severed hollow element is placed immediately after its separation from the tube by parting by thermal shock.

The supporting means may be constituted by a supply element fastened by insertion or the like on the end of a gripping finger.

In a preferred arrangement, the supporting means may be formed during manufacture and in one piece with the respective gripping finger. The supporting means element preferably consists of a bearing surface formed at the respective end of at least one of the gripping fingers.

Tee bearing surface may be a projection disposed near a lower edge or inward-facing end face of a respective gripping finger. Alternatively, the bearing surface is a flat surface formed on a respective gripping finger located outwards of a point of connection between the inner end of the gripping member and a small upwardly extending rod for locating the product thereon.

The present invention will be further described, by way of example only, with reference to the accompanying drawings in which:

FIG. 1 is a perspective view, partly in diagrammatic form of an apparatus embodying the invention for producing hollow glass products, FIG. 2 is a perspective view on an enlarged scale, of a lower gripping head suitable for use in the apparatus as shown in FIG. 1, FIG. 3 is a side elevation on an enlarged scale of the ends of a glass tube end, partly in section, and has gripping fingers of the gripping head shown in FIG. 2, FIG. 4 is a plan view of the end of a gripping finger shown in FIG. 3, FIG. 5 is a view analogous to FIG. 3, showing a modification of the gripping fingers.

Only components directly associated with the present invention have been shown in the drawings. In the Figures, identical reference notations denote equivalent parts.

FIG. 1 shows a rotary apparatus for continuously producing hollow glass products, for example medicinal phials, from glass tubes. An apparatus of this type is well known to those skilled in the art and it is not hereafter described in detail.

On a fixed pedestal 14 a drum 13 is mounted for rotation about a vertical spindle and is provided with lower 8 and upper 8c gripping heads on lower and upper parts of the drum respectively.

The lower part of this drum 13 comprises locating elements 8a for the lower gripping heads 8 in each of which there are slidably mounted a guiding upright 8b and a control rod 10. On the guiding upright 8b and the control rod 10 of a respective locating element 8a is carried a lower case 9 whereon is secured a respective lower gripping head 8.

The upper part of the drum 13 comprises a series of upper gripping heads 8c which remain at an unvarying height with respect to the pedestal and which are aligned with respective lower gripping heads, i.e., the gripping heads in each pair are coaxial with each other. In operation the upper and lower gripping heads of each pair turn synchronously around their common axis when the drum turns around the vertical axis of the machine.

Each of the lower 8 and upper 8c gripping heads comprises a shaft 8d on which is a slider 7 mounted for axial displacement there along. Three connecting rods 6 are pivotally connected to the slider 7 and to three pivotable gripping fingers 1 respectively, equi angularly spaced around the axis of the gripping head 8. In use a glass tube is held along the axis of the respective head of each pair by the inward facing extremities 5 of the gripping finger 1 in the respective gripping heads. The tubes 4 are thus gripped and held firmly at their lower and upper parts.

Severing or parting of the tubes 4 is performed after notches have been cut at predetermined positions in the tubes 4 in a known manner. For each tube 4 the slider 7 of the respective lower head 8 is lowered by a known control mechanism (not shown) thereby causing the inner extremities of the gripping fingers 1 to move away slightly from one another and so the glass element 4a formed is no longer gripped at its lower end. Instead this glass product 4a is suspended by the gripping fingers 1 of the corresponding upper head 8c.

With respect to FIG. 3 and 4, three gripping fingers 1 of each lower gripping head 8 are provided at their extremities 5 thereof with respective projections 16 close to the lower edges of their respective inward facing end faces. The projections 16 extend radially towards the axis of the head and are formed during manufacture of the gripping fingers 1. A kind of socket is thus formed having a recess 16a in each gripping finger 5 above the point of connection of the respective projection 16 to the gripping surface of the extremities 5. The lower end of the tube forming the glass product 4a is suspended within this socket since it is held only by the glass tube 4 integral therewith. This product 4a is then separated from the rest of tube 4 by performing a severing action using thermal shock in known manner; the break is normally perfectly clean.

As soon as the separation has been effected, the glass product 4a drops onto the projections 16, after which the gripping fingers 1 close again on the glass product 4a and hold it firmly, for subjection to subsequent manufacturing operations required.

The control rods 10 of the lower gripping heads 8 are provided at their lower ends 1 with respective rollers 10a which, during rotation of the drum 13, successively follow the tracks of cylindrical cams 11 and 12 fixed to the pedestal 14, so as to displace the said lower heads 8 vertically with respect to the corresponding upper heads 8c. The lower heads 8 whose gripping fingers 1 grip the severed products 4a are then successively lowered to carry the said products 4a to a given location to cause the products 4a to travel past in front of a heating torch or burner 15 positioned at a fixed station, which performs a subsequent desired operation.

A modified form of embodiment of the extremities of the fingers is illustrated in FIG. 5; in this case the inner extremities 5 of the gripping fingers 1 of the lower gripping heads 8 are each equipped with a flat surface 5b formed close to the upper edge of the extremity at the upper side. Moreover, each finger 1 is extended at this upper edge to form a small vertical bar 5a which extends within the lower end of the hollow body 4a which is separated as described before. As soon as it has been separated, the hollow element 4a drops onto the flat surfaces 5b whereupon, by means of a known control mechanism (not shown), the gripping fingers 1 and the rods 5a tend to move apart from one another thereby firmly holding the said glass element 4a from the inside, which may then undergo the other operations required.

Thus the separated products are substantially unshielded during the severing operation and are held at a constant level. This reduces the number of rejects since the break produced is nearly always perfect.

The supporting means may be constituted by pins screwed or otherwise secured in the inner extremities of the gripping fingers. The supporting means may be releasably or permanently attached to the said fingers.

Having described my invention, I claim:

1. In a machine for the production of hollow glass bodies from glass tubes, comprising a fixed pedestal, a drum rotatable on said pedestal about a vertical axis, rotating upper grippers on said drum to hold glass tubes during cutting of the tubes, and blowpipes arranged at fixed stations around said rotary drum for heating tubes held by said rotary upper grippers to sever by thermal shock lower portions of the glass tubes from the upper portions of the glass tubes that are held by said rotary upper grippers; the improvement comprising rotating lower grippers in vertical alignment with said rotating upper grippers, said rotating lower grippers each comprising a plurality of gripping fingers, each of said gripping fingers having an upwardly facing surface to receive and support jointly with another said gripping finger the lower end of a severed said lower portion of a glass tube, each said gripping finger having a portion extending upwardly and laterally offset from said upwardly facing surface to form with said upwardly facing surface a recess to receive and to grasp jointly with said upwardly extending portion of another said gripping finger a said severed lower portion of a glass tube, and means to move said gripping fingers horizontally toward and away from each other thereby jointly first to support and then to grasp and then to release a said severed lower portion of a glass tube.

* * * * *